Aug. 5, 1958 R. CLARET ET AL 2,845,710
DEVICES FOR DIRECTLY MEASURING AND INSTANTANEOUSLY
RECORDING THE ANGULAR DISPLACEMENTS OF A BODY
Filed Feb. 17, 1950 7 Sheets-Sheet 1

Inventors
René Claret and
Jean Bonjital
by Brown & Leward
attorneys

Aug. 5, 1958  R. CLARET ET AL  2,845,710
DEVICES FOR DIRECTLY MEASURING AND INSTANTANEOUSLY
RECORDING THE ANGULAR DISPLACEMENTS OF A BODY
Filed Feb. 17, 1950  7 Sheets-Sheet 2
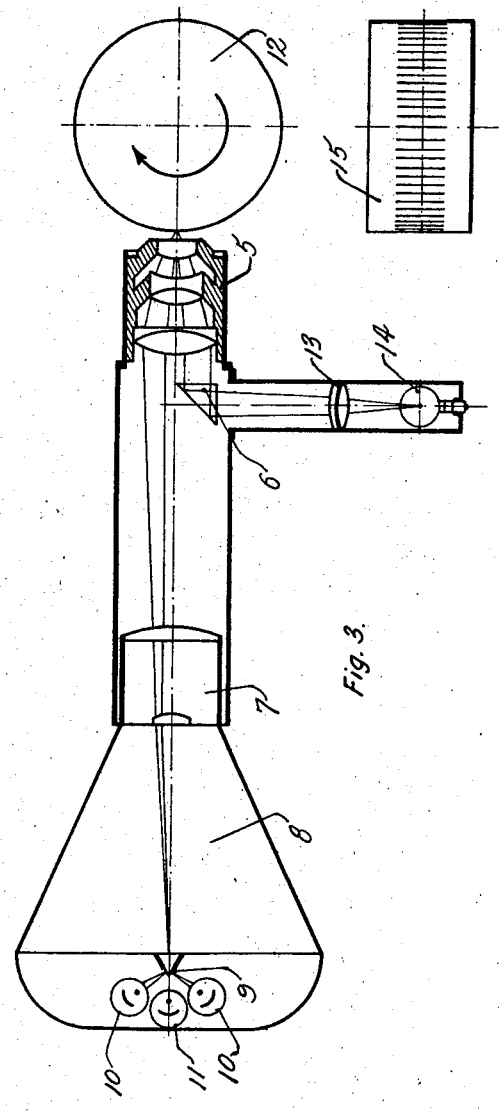
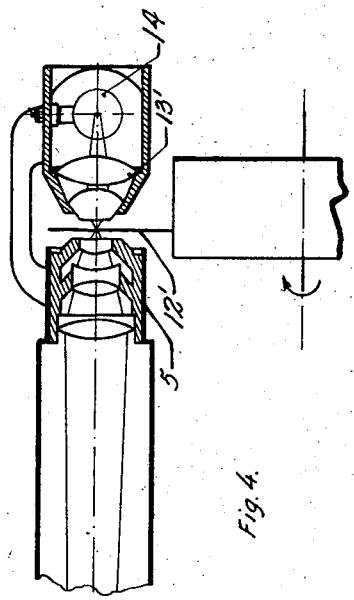
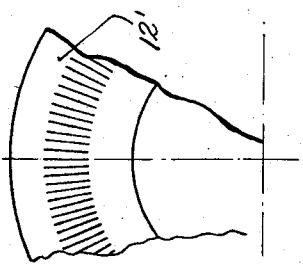
Inventors
René Claret and
Jean Bouzitat
by Brown & Deward
Attorneys Aug. 5, 1958 R. CLARET ET AL 2,845,710
DEVICES FOR DIRECTLY MEASURING AND INSTANTANEOUSLY
RECORDING THE ANGULAR DISPLACEMENTS OF A BODY
Filed Feb. 17, 1950 7 Sheets-Sheet 3

Inventors
René Claret and
Jean Boujelot
by Brown & Seward
Attorneys

Aug. 5, 1958    R. CLARET ET AL    2,845,710
DEVICES FOR DIRECTLY MEASURING AND INSTANTANEOUSLY
RECORDING THE ANGULAR DISPLACEMENTS OF A BODY
Filed Feb. 17, 1950    7 Sheets-Sheet 6
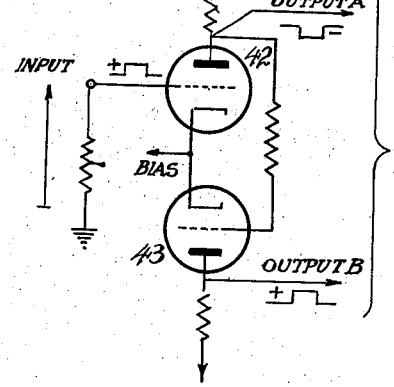
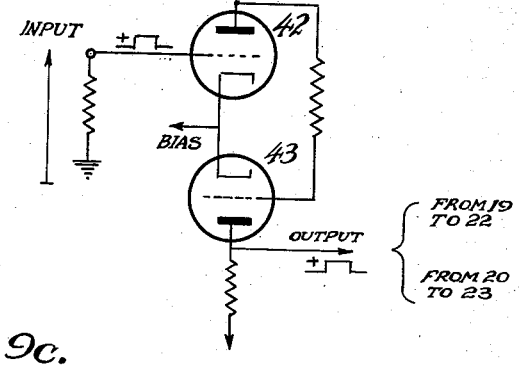
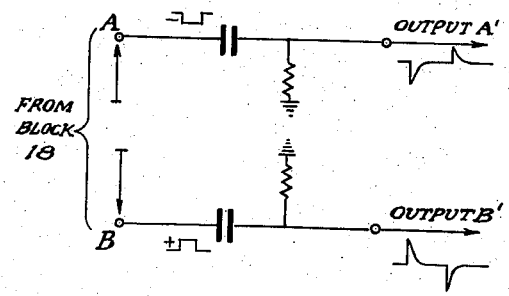
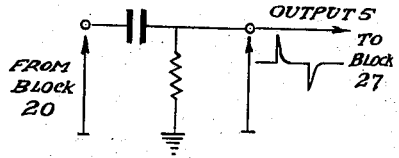
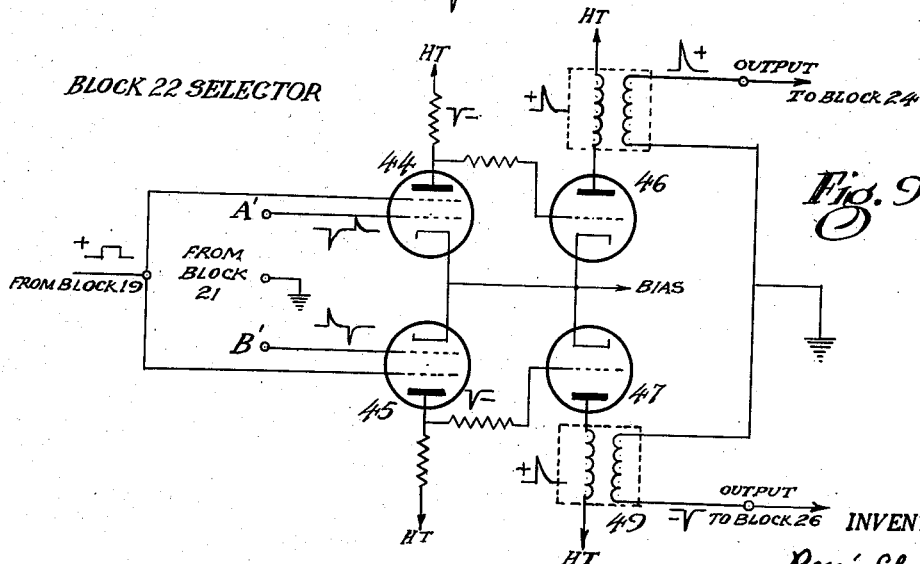
INVENTORS.
BY René Claret and
Jean Boujitat
Brown & Seward
ATTORNEYS Aug. 5, 1958 R. CLARET ET AL 2,845,710
DEVICES FOR DIRECTLY MEASURING AND INSTANTANEOUSLY
RECORDING THE ANGULAR DISPLACEMENTS OF A BODY
Filed Feb. 17, 1950 7 Sheets-Sheet 7
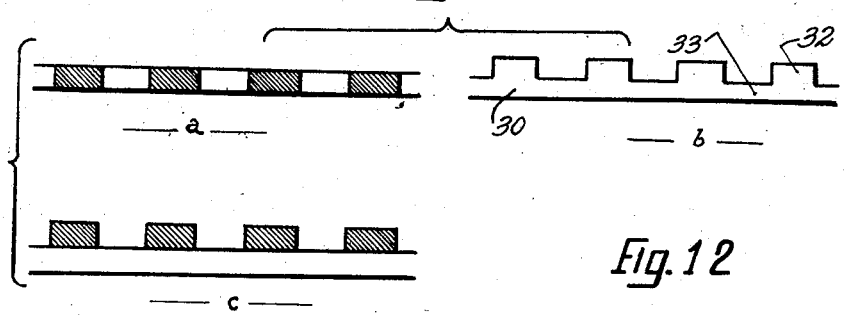
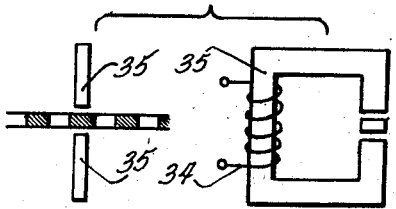
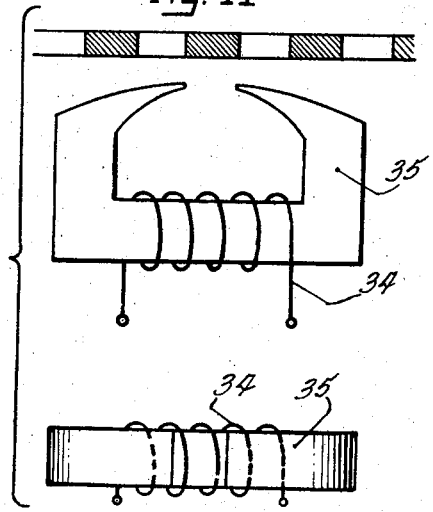
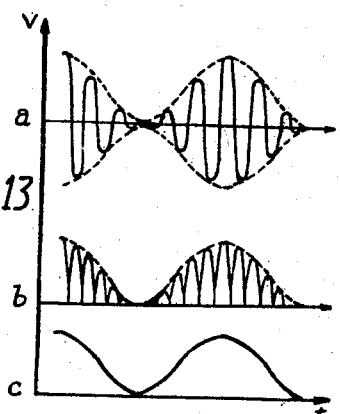
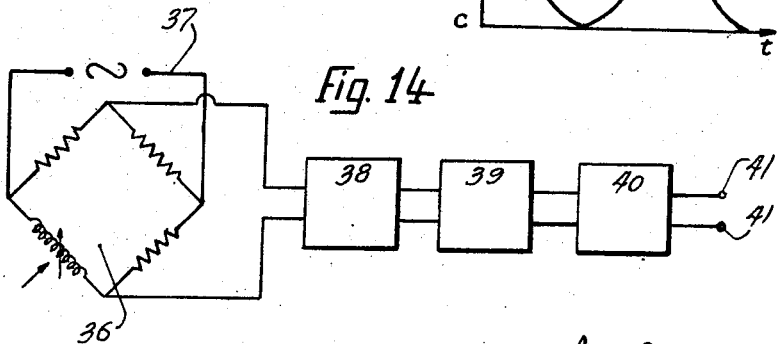

United States Patent Office 2,845,710
Patented Aug. 5, 1958

2,845,710

DEVICES FOR DIRECTLY MEASURING AND INSTANTANEOUSLY RECORDING THE ANGULAR DISPLACEMENTS OF A BODY

René Claret and Jean Bouzitat, Paris, France, assignors to Office National d'Études et de Recherches Aeronautiques, Paris, France, a company of France Application February 17, 1950, Serial No. 144,712

Claims priority, application France February 14, 1949

5 Claims. (Cl. 33—1)

In many apparatus comprising a body adapted to move about a fixed point, it is interesting to know, at any time, the position of said body with respect to its original position. Many attempts have been made to measure such displacements by the most diverse methods.

However, the known methods offer the drawback, due to the mechanical links between said body and the measuring devices, of giving rise to disturbances in the displacements of said body.

In order that the measures may give an accurate indication of the body position, it seems indispensable to avoid any action of the measuring system upon the free displacements of said body.

On the other hand, it is often necessary, at least with certain types of apparatus, such as gyroscopes, to measure displacements having a considerable amplitude, which seems hardly possible with systems employing mechanical links.

This invention has for its object an apparatus adapted to read directly displacements of a body about a point without any mechanical link between said body and the reading apparatus and to materialize said readings under such a shape that they may be recorded in an apparatus constituting a kind of counting device capable of indicating, at any time, the position of said body with respect to a well-defined reference system.

According to an embodiment of the invention, there is associated with the body of which the angular displacements are to be measured three graduated limbs, each of which is located in one reference plane and three reading devices, each of which acts in combination with one of said limbs, said reading apparatus being capable of producing electric pulses according to the relative angular displacements between said limbs and said reading devices, said pulses being fed, if required, after a suitable amplification, into at least one recording apparatus capable of giving, at any time, the angular position of the body with respect to the reference system selected.

According to a first constructive embodiment, the reading apparatus are constituted by optical devices, the light rays influenced by the angular displacements of the body acting upon a system of photoelectric means capable of transforming the indications from the optical system into electric pulses.

According to a second constructive embodiment, the reading apparatus are of electro-magnetic type, the displacements of the body varying a characteristic of the current which feeds the electro-magnetic system, said variable characteristic being used to act upon the above-mentioned counting device.

It will be easily understood that with the apparatus according to the invention, the measuring operation takes no mechanical torque from the body of which the displacements are to be measured. Moreover, the system according to the invention permits to measure, at any time, the desired displacement, without disturbing said displacement.

Finally, in contradistinction with the known counting devices such as galvanometers which permit to measure only limited angular displacements, the apparatus according to the invention permits to measure unlimited angular displacements.

The apparatus according to the invention gives for each displacement to be measured a transmittable and numerically recordable value, the measures thus obtained having besides a great accuracy.

According to one embodiment of the apparatus according to the invention, the angles to be measured are materialized by graduated limbs, according to a well-defined function of said angles and there is used for reading, microscopes having a magnifying power equal to or higher than 1 and giving equal or magnified images of the limb graduations. Said limbs are illuminated by a source judiciously arranged, e. g. in the manner of the self illuminating microscopes. The images of the graduations are received on photo-electric means generating electric signals which may be transmitted at a distance to suitable counting devices.

According to another embodiment of the apparatus according to the invention, the angles to be measured are materialized by graduated limbs according to a well-defined function of said angles, said graduations being constituted by parts having a certain magnetic permeability separated from one another by parts having a different magnetic permeability and there is used, for reading, electro-magnetic means responsive to magnetic field variations resulting from the permeability differences of the various parts of the graduated limbs and which transmit signals corresponding to said variations to suitable receiving means. Said signals are used, at a distance, in appropriated counting means to give the desired measure indication.

The invention will be more easily understood with reference to the accompanying drawings in which some embodiments of the invention have been shown as a mere illustration.

In these drawings:

Fig. 3 shows one embodiment of the reading microscopes with a reflection lighting such as used in the self-illuminating microscopes. Fig. 3a represents a detail view of the cylindrical limb showing the graduations thereon.

Fig. 4 shows another embodiment of the reading microscope using transparency lighting. Fig. 4a represents a detail view of a sector of the annular limb showing the gaduations therein.

Figs. 9a through 9e are detailed circuit diagrams showing in simple form the basic components of the circuit arrangement of Fig. 9.

Fig. 10 shows three embodiments of the graduations of a limb, in the case of the electro-magnetic reading.

Fig. 11 shows an illustrative embodiment of an electro-magnetic reading device.

Fig. 12 shows another embodiment of an electro-magnetic reading device.

Fig. 13 is a set of curves showing the electric outputs of the bridge, rectifier and filter, respectively.

Fig. 14 shows an electro-magnetic reading device ensuring in the same time the transmission of the corresponding signals, said device comprising, inter alia, a Wheatstone bridge circuit.

Figure 1:
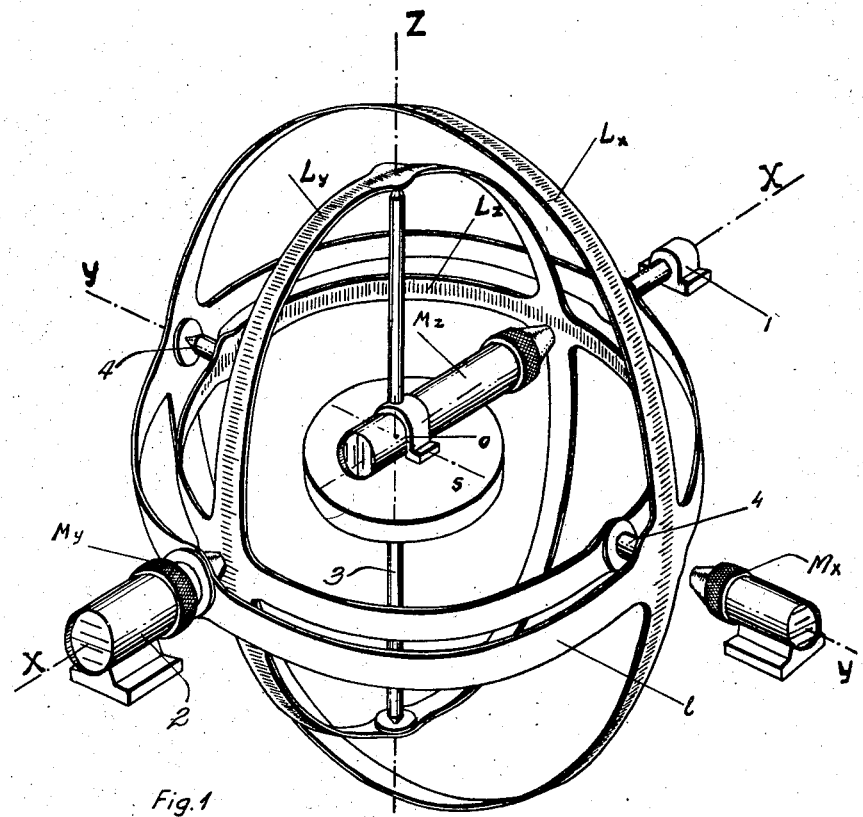
Fig. 1 is a perspective view showing the manner in which is mounted the solid body of which the angular displacements around a fixed point are to be measured, as well as the reading optical devices.

In Fig. 1, the solid body of which it is desired to measure the angular displacements about a fixed point 0 is shown at S. In the selected system, the three rotation axes of the solid S are X—X, Y—Y and Z—Z, respectively. The angular displacements about axes X—X, Y—Y and Z—Z are materialized by three graduated limbs, $L_x$, $L_y$, $L_z$, respectively. The rotation of limb $L_x$ around axis X—X is ensured by a fourth, non-graduated limb $l$ rotatively mounted at both ends of its diameter, which is normal to the plane containing $L_x$, on bearings 1 and 2. The planes of the graduated limbs $L_y$ and $L_z$ are perpendicular to one another as well as their respective rotation axes, one of which, along Z—Z, is materialized by a diametral rod 3 extending within the graduated limb $L_y$, the other rotation axis, along Y—Y, being materialized by two pivots 4, 4 located outside the graduated limb $L_z$. The planes of the graduated limbs $L_x$ and $L_y$ are perpendicular to one another as well as their respective rotation axes. Moreover, the three axes converge towards one point 0. Rod 3 carries the reference solid S. The limb $L_z$ is graduated innerly, while limbs $L_x$, $L_y$ are graduated externally. Three microscopes $M_x$, $M_y$ and $M_z$ ensure the optical reading of the respective displacement angles of the reference body on the three graduated limbs $L_x$, $L_y$ and $L_z$, respectively. Said microscopes are continuously maintained in the planes of the corresponding limbs. For this purpose, microscope $M_x$ may be fixedly secured on plane P (see Fig. 2), microscope $M_z$ being mounted on the reference body and microscope $M_y$ being mounted on the axis of bearing 2 and rotating therewith.

Figure 2:
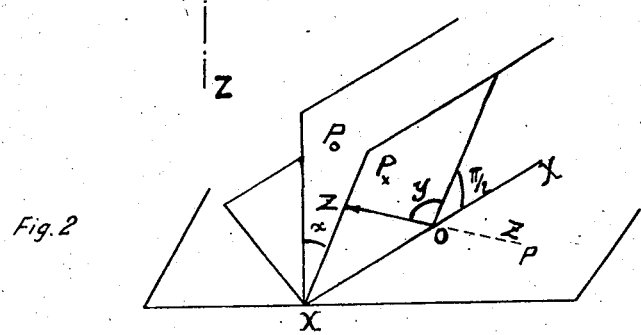
Fig. 2 is an explanatory diagram showing the reference system selected.

In Fig. 2, the origins and directions of angles $x$, $y$, and $z$ which measure the displacements of solid S about the fixed point 0 around the three axes X—X, Y—Y and Z—Z, respectively, are shown in the following manner: the dihedral angle $x$ defining plane $P_x$ which contains axis Z—Z is measured from plane $P_o$ normal to plane P, the intersection of both last said planes being axis X—X and the angles being positive in one direction and negative in the other one.

Angle $y$ defining axis Z—Z is measured in each plane $P_x$ corresponding to angle $x$ from the perpendicular to axis X—X, the angles being positive in one direction and negative in the other one.

Angle $z$ defining the position of solid S around axis Z—Z is measured in the plane passing through the fixed point 0 and right-angled to axis Z—Z, from the trace, oriented in said plane, of plane $P_x$, the angles being positive in one direction and negative in the other one.

Figure 5:
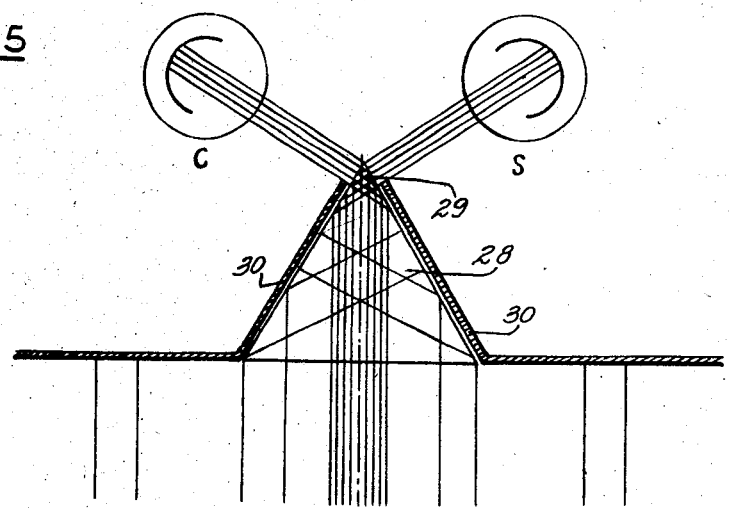
Fig. 5 shows light rays outgoing through a separating slot constituted by the faces inclined to each other by 60° of a total reflection prism, and the manner in which said rays impinge upon two of the photo-electric cells.

In Fig. 3, there is shown at 5 the objective of the microscope, at 6 the prism of the vertical illuminator, at 7 the lens system, at 8 the light-tight chamber, at 9 the separating slots constituted by a 60° total reflection prism as shown in detail in Fig. 5, at 10—10 the counting and selecting cells, at 11 a re-setting cell, at 12 the cross-section of the cylindrical limb, at 13 the illuminating condenser, at 14 the lamp thereof and at 15 the graduation of the cylindrical limb. The path of the light rays is as follows: lamp 14, condenser 13, prism 6, objective 5, graduated limb on which the rays are reflected, objective 5, lens system 7, light-tight chamber 8, separating slots 9, cells 10—10. As shown in this figure (also in Fig. 4) the microscope has a magnifying power greater than unity and thus projects on the eye-piece 7 an enlarged image of the graduations.

In Fig. 4, the mode of illumination shown, acts by transparency. In this figure, the parts corresponding to those of Fig. 3 are indicated by the same references. The illuminating means in this embodiment comprises lamp 14 and separate lens combination 13′ for concentrating the light on a transparent circular limb 12′. The path of the light rays is as follows: lamp 14, lens combination 13′, circular graduated limb 12′ through which they are transmitted, objective 5, after which the rays follow the same path as in Fig. 3.

In the case of Fig. 3, the limb graduations 15 are provided on cylinder 12, while in the case of Fig. 4, said graduations are radial and provided on disc 12′.

Figure 6:
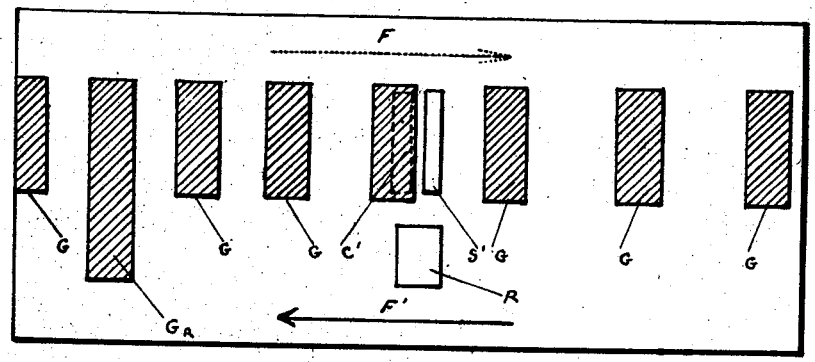
Fig. 6 shows on a larger scale the graduations of a limb, as they successively pass in both directions opposite to the slots corresponding to the counting and selecting photo-electric cells and to the re-setting cell.

In Fig. 6 is shown on a larger scale the image plan of the photographic chamber with a portion of the limb aimed at, the graduations being indicated by hatched rectangles G. Rectangles C′ and S′, respectively, indicate the slots of the counting and selecting cells. Rectangle R is the slot of the re-setting cell. It will be noted that one graduation $G_r$ is longer than the other ones, so as to act upon the re-setting cell. The limb may pass along in both directions indicated by arrows F and F′. Graduation $G_r$ ensures or controls the registration of the number transmitted with the limb position. The term "re-setting" means here "setting into registration" since it is possible to provide several registration marks for various values of the transmitted function. In other words, the function of the re-setting cell is to reset the counting device to zero after a predetermined number of pulses has been counted, this number being simultaneously recorded, and as this is produced under the control of a predetermined graduation mark of the limb, it is evident that in this way the indication recorded registers with the true position of the body about a corresponding axis.

Figure 7:
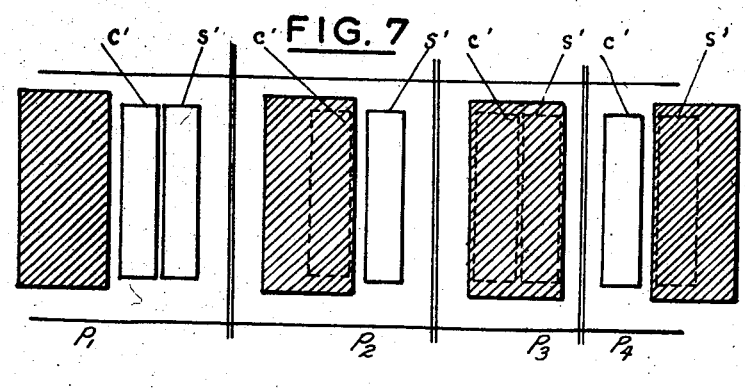
Fig. 7 shows the same graduations on a still larger scale in four characteristic positions.

In Fig. 7, are shown four typical positions of a limb graduation with respect to slots C′ and S′ of the counting and selecting cells illustrating the manner in which the graduations passing in front of the cells are counted. It will be assumed that the graduations are materialized by opaque or obscure lines on a light background; it would be possible to use as well light lines on a dark background.

Figure 8:
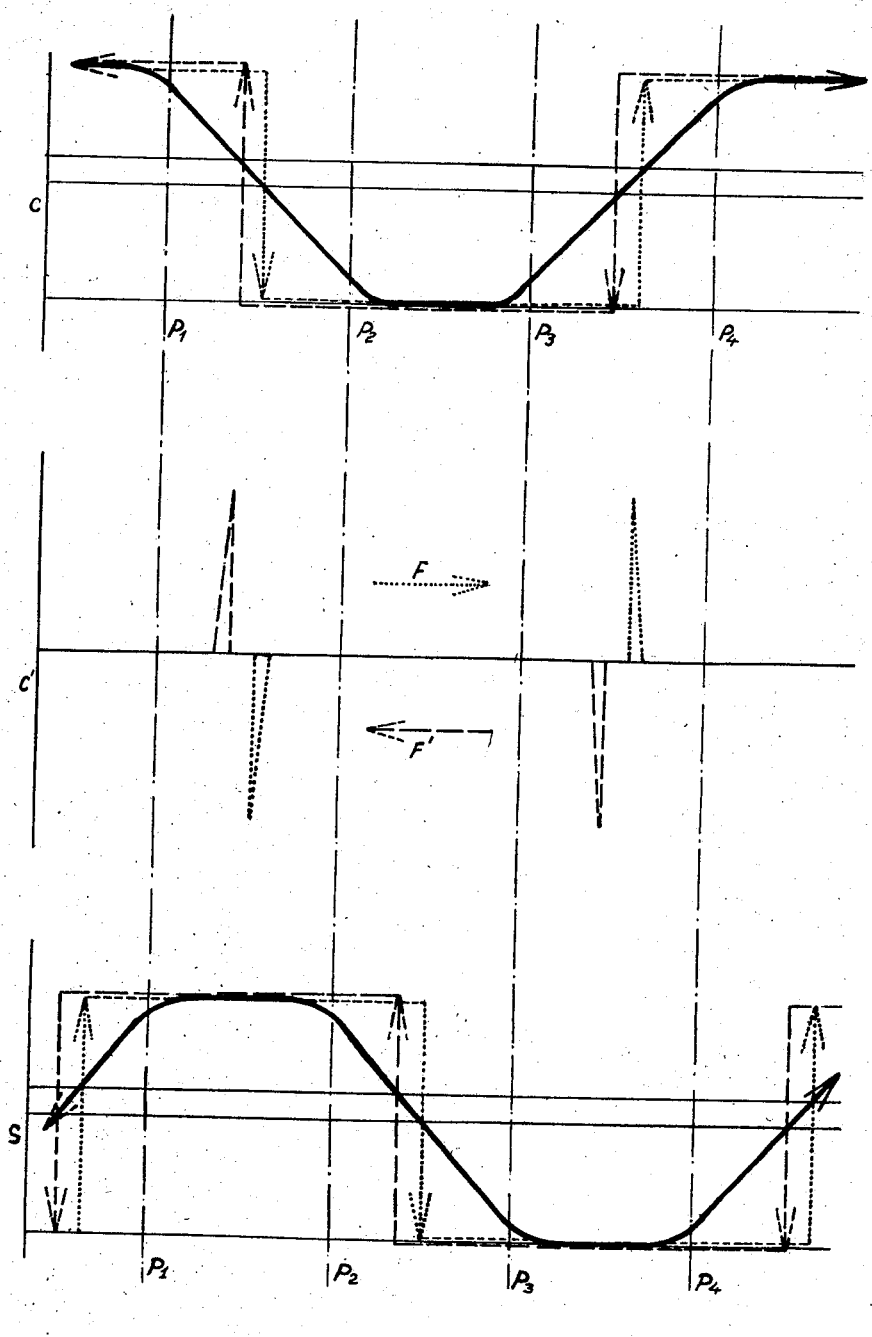
Fig. 8 shows the shape of the output pulses of the counting and selecting photo-electric cells and the timing of said pulses for both directions of the relative displacement between the limbs and the microscopes.

Under these conditions, there is shown in Fig. 8 a set of curves in which the full lines show the amplified output signal of the cells, the intensity of said signal being plotted as ordinates and the displacements of the graduation being plotted as abscissae, the marks $P_1$, $P_2$, $P_3$ and $P_4$ corresponding to the positions of Fig. 7 indicated by the same references. The corresponding displacement directions are indicated by arrows F, F′.

Curve $c$ corresponds to the output signal of cell C, curve $c'$ shows the pulses obtained after said signal has been transformed into square pulses in a slave multivibrator (not shown), and after said square pulses have been differentiated, and curve $s$ shows the output signal of cell S and the corresponding square pulses.

It may be seen that there is an abscissae shift between the output signals of cells C and S, said shift being essential to the use of the method according to the invention. The square signals derived from the output of the cells under the action of a slave multivibrator, as indicated above, are shown in point line for direction F and in dashed line for direction F′. Both types of square pulses are slightly shifted along the X axis, due to the phase difference between the triggering voltages of the electric circuits according as whether said triggering takes place for an increasing signal or for a decreasing one.

The square pulses of cell C are then transformed into sharp positive pulses or "pips" corresponding to the increasing variation of the output signal of the cell and into negative pulses corresponding to the decreasing variation of said signals. The polarity of the pulses is thus changed when the direction F is turned over to direction F'. This is used for counting; since the pulse polarity is determined by the sign of the variations of a given edge of the output signal of cell, it suffices to keep for counting the pulses corresponding either to the leading edges of the output signal or to its trailing edge. Thus, for example, all pulses will be positive for direction F and all will be negative for direction F' or vice versa, which permits to count and integrate said pulses in the counting device specially provided for this purpose. The function of the selecting cell S is precisely to transmit only pulses derived from homologous edges. This filtering operation, according to the amplitude of the voltage of signal S is effected in a suitable selector.

For example, only pulses C pertaining to position period $P_1$—$P_2$ of Fig. 7 will be transmitted while those occurring during period $P_3$—$P_4$ will be stopped and this, whichever may be the displacement direction, due to the fact that the pulses of period $P_1$—$P_2$ meet the output of cell S at a higher amplitude level.

Figure 9:
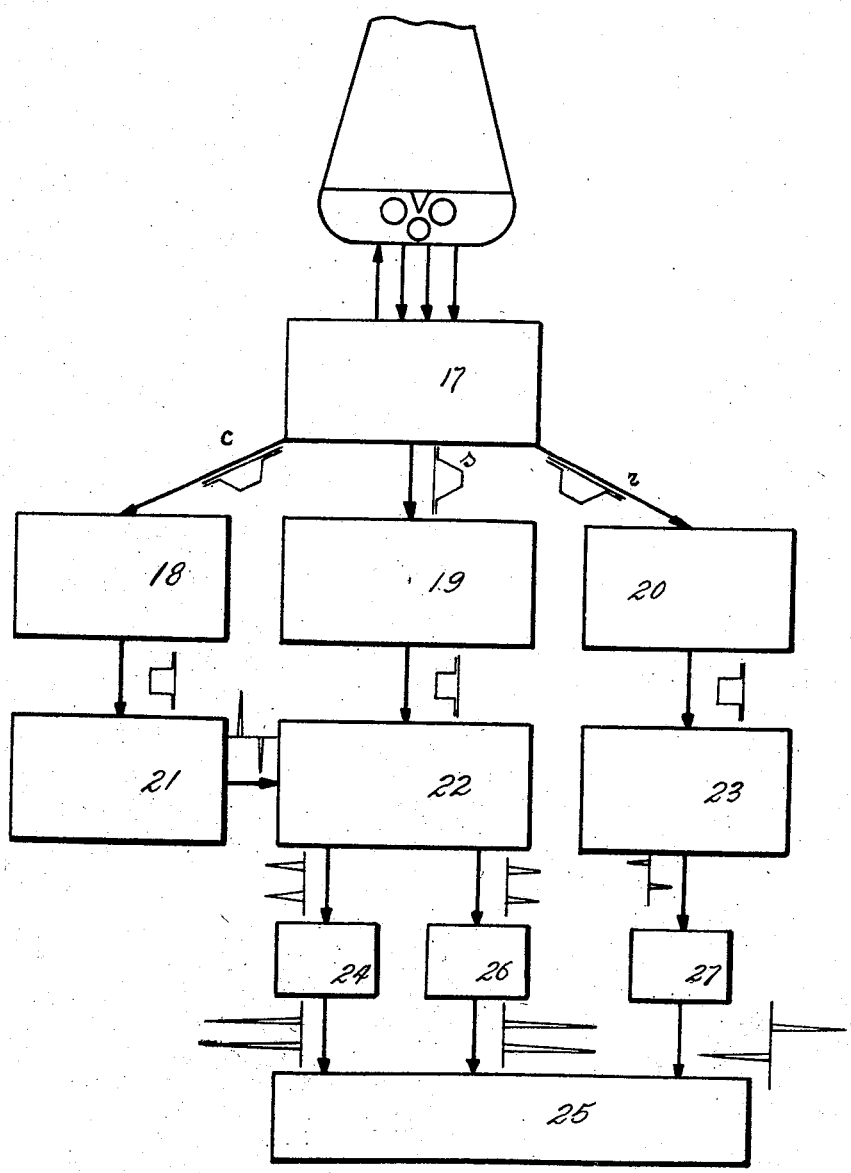
Fig. 9 is a block wiring diagram of the circuit using the output signals of the photo-electric cells.

Fig. 9 shows diagrammatically the utilisation circuit of the cell output signals.

Rectangle 17 indicates the feeding and amplifying device of the cell output signals. At the output of device 17, the C signal is fed to a slave multivibrator 18, the S signal is fed to a slave multivibrator 19 and the R signal, which is the output signal generated by the resetting cell 11 (Fig. 3) in response to illumination of the said cell through slot R, is fed to a slave multivibrator 20.

The square output pulses from multivibrators 18, 19 and 20 are fed to a differentiator 21, a selector 22 and a differentiator 23, respectively. The positive pulses from selector 22 are amplified by an amplifier 24 and fed to a counting device 25 for the adding operations and the negative pulses from selector 22, after having been amplified in an amplifier 26, are fed to said counting device 25 for the subtracting operations. On the other hand, the alternatively positive and negative pulses from differentiator 23 of the re-setting square signal are fed to counting device 25 after a suitable amplification in an amplifier 27.

Fig. 5 shows diagrammatically and as an illustration a 60° prism 28 which may be used as a double separating slot. The light beam projecting the limb graduations is divided at the apex 29 of said prism into two beams which impinge, the first one on the counting photo-electric cell C and, the other one, on the selecting photo-electric cell S. Only the useful end of prism 28 is outside, the remaining surfaces of the prism being protected by masks 30—30. Masks 30 are separated from the corresponding faces of the prism by very thin air films.

The device operates as follows:

Any angular displacements of the reference solid S around the fixed point 0 causes a relative displacement between one or more of the three microscopes and the corresponding graduated limb or limbs.

Since the operation is the same with respect to the three angular displacement axes, it will be sufficient to describe only one of them. The light rays generated by source 14 impinge upon the graduation of limb 12 which is at this moment in front of the corresponding microscope axis and are either reflected or transmitted by transparency through the optical system of said microscope towards the separating prism 28 which distributes them between the counting and selecting cells C and S. Under the action of said light rays, said cells generate electric signals the amplitude of which varies as a function of the light flow impinging upon the cells, i. e. as a function of the optical properties of the portions of the limb subjected to the impact of the light rays, such as their transparency or their reflecting power, according to whether said rays are transmitted through said limbs or reflected by the same.

The output signals of the cells, after having been subjected to the various transformations described above, thus act upon the counting device 25.

Referring to Figs. 9a through 9e, for a more detailed disclosure of the above described arrangement, it will be noted that rectangles 18, 19 and 20 represent multivibrators having one stable condition or state and adapted to be triggered out of said condition by the input signal whereupon they reassume by themselves said stable condition. These multivibrators are somewhat similar to the so-called "flip-flop circuits" well known in the electronic computers.

Each multivibrator comprises two tubes 42 and 43 (see Fig. 9a corresponding to rectangle 18 and Fig. 9b corresponding to rectangles 19 and 20).

In the case of multivibrator 18, the positive signal from the counting cell C is fed through amplifier 17 on the control grid of tube 42 which was biased to cut-off in the absence of the signal. Tube 42 is temporarily made conductive for the duration of the signal, while, due to the coupling between the anode of tube 42 and the grid of tube 43, the latter is temporarily brought to cut-off.

As a result, there is fed simultaneously across the load resistance of each tube 42 and 43 a square pulse which is negative for tube 42 and positive for tube 43, respectively.

In the case of multivibrator 18, both pulses are injected into a differentiating circuit 21. In multivibrators 19 and 20 (see Fig. 9b), which are similar to multivibrator 18, only the positive square pulses drawn across the load resistance of tube 43 are injected into selector 22 from multivibrator 19 and into a differentiating circuit 23 similar to 21 from multivibrator 20, respectively.

The differentiating circuits 21 and 23 are time constant capacity-resistor circuits.

In 21 (see Fig. 9c), two similar circuits are used for transforming the input square pulses of opposite signs into two opposite and simultaneous sets comprising each two pulses of opposite signs; when the direction F is reversed into direction F', all pulses are inverted.

In differentiating circuits 23 (see Fig. 9d), one single circuit acts in the same manner on the positive square pulse signal fed thereto.

The selector 22 (Fig. 9e) comprises two pentodes 44 and 45 mounted in push-pull. The control grids of both pentodes are fed simultaneously and respectively with the above mentioned opposite sets of two pulses from differentiating circuit 21. The remaining grids are fed, in parallel with the positive rectangular signal, directly from multivibrator 19.

In the absence of any signal from 19, tubes 44 and 45 remain in the cut-off condition whatever may be the sign of the pulses from 21.

On the contrary, when said remaining grids are biased positively by the square pulse signal from 19, the positive pulse fed at the same instant from 21 renders conductive that tube 44 or 45 which corresponds thereto, the other tube further remaining in cut-off condition since it is fed with a negative pulse. An output negative pulse is then generated across the load resistance of that tube which is then conducting.

In these conditions, in each direction F and F', negative pulses are generated from either lamp 44 or 45, lamp 44 corresponding, for example, to direction F, while lamp 45 corresponds to direction F'.

Two pre-amplifier tubes 46 and 47 are fed with the negative pulses from tubes 44 and 45 respectively and generate, across their load resistances, amplified positive pulses. The latter are fed through windings of two pulse transformers 48 and 49, one of which is reversely coupled, so that amplifier 24 is fed with positive pulses while amplifier 26 receives negative pulses, the output pulses of both amplifiers being thence injected into counting device 25, as explained.

Whenever it is required to reset the indication of the counting device into registration with the limb position, e. g. after the main feeding circuit has been interrupted, the longer graduation $G_r$ of the limb provided for this purpose, acts as described above upon the re-setting cell which acts in turn through the various electric devices indicated above, on the counting device.

The second embodiment of the invention is shown in Figs. 10 to 14. In this embodiment, the graduation of the limbs is materialized in the following manner.

The graduation lines to be counted are represented by parts having a high magnetic permeability, separated from one another by low permeability parts which represent the gaps (the converse convention might be clearly adopted).

This arrangement may be embodied in several manners, e. g. it is possible to stack alternatively strips of a high permeability metal (such as anhyster) and strips of a non-magnetic material (such as paper) (Fig. 10a).

It is also possible to provide a flat plate 30 made of a magnetic and homogeneous material in which are engraved graduation lines (Fig. 10b), the thick portions 32 representing said lines and the thin portions 33 representing the gaps therebetween.

There may be also provided a thin brass plate on which is deposited, e. g. divided iron, the graduation lines being then so engraved that the divided iron is completely removed in the bottom of the engravings (Fig. 10c).

The reading head represented in Figs. 11 or 12 is constituted by a coil 34 wound on a core of a high magnetic permeability metal 35. Said core has such a shape that the magnetic circuit is completed through a very narrow gap so that the passage of a line of the graduation in the neighbourhood of said gap varies considerably the reluctance of the magnetic circuit and, thence, the inductance of the coil.

This reading head may be embodied in several manners. For example, the magnetic core may be constituted by a stack of a few metal sheets as indicated at 35 in Fig. 12, the end of each pole shoe having a thickness smaller than or equal to that of a graduation line. Said sheets have the shape of a C or of a rectangle portion interrupted by a gap. The graduation then passes along in the gap.

The reading head may also assume the shape shown in Fig. 11. The width of the gap is then substantially equal to that of a graduation line and said graduation passes along near the gap (at a distance smaller then the width of a line).

When a graduation line of high permeability passes in front of the gap, the reluctance is reduced and, therefore, the inductance of the coil is increased.

For measuring this inductance variation, the same may be for example fed to a Wheatstone bridge 36 shown in Fig. 14.

Let $n$ be the maximum number of graduation lines capable of passing in front of the reading head in one second; bridge 36 will then be fed by a source of alternating current having a frequency far higher than $n$, e. g. equal to $10n$, said source being diagrammatically shown at 37.

When no high permeability graduation line is in front of the reading head, the bridge has no output.

When, however, a graduation line is then in front of said head, an alternating current having a frequency of $10n$ is obtained at the output of the bridge.

When the graduation passes along in front of the reading head, there is obtained at the output of the bridge an alternating current of frequency $10n$ modulated at a frequency equal to the number of lines passing in one second in front of the reading head.

After having been suitably amplified in amplifier 38, the current having the $10n$ frequency is rectified in a rectifier 39 and then fed to a low-pass filter 40, the cut-off frequency of which is equal to $5n$. Then, there is obtained at the output terminals 41—41 of said low-pass filter 40 a signal which is a maximum when a line passes in front of the reading head and a minimum in the opposite case. The amplitude of said signal is independent of the speed with which the lines of the graduation pass along in front of the head.

Fig. 13 is a set of curves showing at $a$ the output of the bridge, at $b$ that of the rectifier and at $c$ that of the filter.

In this embodiment of the invention, there is provided as in the optical embodiment described above, three reading heads, the first one ensuring the counting, the second ensuring the selection and the third, being a re-setting head.

The output signals of the filter are used in a manner similar to that of the output signals of the photo-electric cells and act, also in a similar manner, upon the counting device.

It is to be understood that the invention is in no way limited to the embodiments described and shown and that many modifications may be made within the scope of the invention. In particular, the reading devices may be fixed, the graduated limbs being movable, but the reverse arrangement may be contemplated as well.

What is claimed is:

1. A device for directly reading and instantaneously recording displacements of a body about a fixed point, comprising three circular reflecting limbs carrying graduations constituted by lines having a colour intensity differing from that of the limbs and spaced according to a well-defined function of the angular displacements to be meansured, one of said lines being longer than the other ones, each limb being located in one reference plane and having said point for its centre, light sources, microscopes to transmit light rays from said sources reflected on said graduations, optical means to separate the light rays received from each of said microscopes into a pair of beams, a counting photo-electric cell responsive to the variations of intensity of one of each pair of said beams due to said differences of colour intensity to generate electric pulses, a selecting photoelectric cell responsive to the variations of intensity of the other beam of each pair to select among said electric pulses those which correspond to the graduation lines contained in the displacement to be measured, a re-setting photo-electric cell responsive to said longer graduation line of each pair to reset the information transmitted into registration with the position of the limb, recording means to count said last mentioned pulses and to give at any moment the angular position of said body in the reference system comprising said reference plane and means to transmit said pulses from said electric pulse generating means to said recording means.

2. A device according to claim 1 in which said limbs are dark, while said lines are light.

3. A device according to claim 1 in which said limbs are light, while said lines are dark.

4. A device for instantaneously reading and recording the successive values of three parameters defining the successive instantaneous positions of a body movable about a fixed point, without exerting any perturbative action upon the motion of said body, comprising in combination, three circular graduated limbs, having said point for their common center and adapted to rotate about three mutually perpendicular axes X, Y, Z, respectively at right angles to their planes, said axes all passing through said point, means for generating electric pulses adapted to define said values and means responsive to electric pulses to record said successive values, said pulse generating means comprising, cooperating with each limb, optical reading means for reading the graduations of said limb, a source of light illuminating the graduations of said limb so as to produce two different levels of light output intensity according to whether a graduation is or is not in front of said optical reading means, a pair of photoelectric cells for controlling the generation of said electric pulses, means for directing the light output from said optical means on said two photo-electric cells comprising two adjacent light transmitting passages dividing said light output into two portions directed onto said two cells respectively, said light transmitting passages being of a rectangular cross section, smaller in width than the half width of a single limb graduation and spaced apart so that the distance between their outside edges, equals at maximum the width of such single graduation, so that depending upon the direction of relative movement between the limb and said optical reading means, the electric pulses produced by one of the photo-electric cells upon the passage of a graduation lead or lag with respect to the pulses produced by the other cell, upon the passage at the same graduation, this phase difference between the other of said photo-cells being used to produce pulses of one polarity for one direction of relative movement and pulses of the opposite polarity for the opposite direction of said relative movement.

5. A device for instantaneously reading and recording the successive values of three parameters defining the successive instantaneous positions of a body movable about a fixed point, without exerting any perturbative action upon the motion of said body, comprising in combination, three circular graduated limbs, having said point for their common center and adapted to rotate about three mutually perpendicular axes X, Y, Z, respectively at right angles to their planes, said axes all passing through said point, means for generating electric pulses adapted to define said values and means responsive to electric pulses to record said successive values, said pulse generating means comprising, cooperating with each limb, optical reading means for reading graduations of said limb, a source of light illuminating the graduations of said limb so as to produce two different levels of light output intensity according to whether a graduation is or is not in front of said optical reading means, a pair of photo-electric cells for controlling the generation of said electric pulses, means for directing the light output from said optical means on said two photo-electric cells comprising two adjacent light transmitting passages dividing said light output into two portions directed onto said two cells respectively, said light transmitting passages being of a rectangular cross section, smaller in width than the half width of a single limb graduation and spaced apart so that the distance between their outside edges, equals at maximum the width of such single graduation, so that depending upon the direction of relative movement between the limb and said optical reading means, the electric pulses produced by one of the photo-electric cells upon the passage of a graduation lead or lag with respect to the pulses produced by the other cell, upon the passage at the same graduation, means for mixing the pulses produced by said two cells whereby pulses of one polarity are retained for one direction of relative movement and pulses of opposite polarity are retained for the opposite direction of said movement, whereby they can be additively or subtractively counted depending on the direction of said relative movement.

References Cited in the file of this patent

UNITED STATES PATENTS

| Number | Name | Date |
|---|---|---|
| 464,261 | Beehler | Dec. 1, 1891 |
| 703,139 | Lawless | June 24, 1902 |
| 865,278 | Stannard | Sept. 3, 1907 |
| 1,998,132 | Geffcken et al. | Apr. 16, 1935 |
| 2,073,246 | Merrick | Mar. 9, 1937 |
| 2,077,398 | Clark | Apr. 20, 1937 |
| 2,080,490 | Kollsman | May 18, 1937 |
| 2,183,765 | Coleman | Dec. 19, 1939 |
| 2,295,000 | Morse | Sept. 8, 1942 |
| 2,339,508 | Newell | Jan. 18, 1944 |
| 2,351,955 | Graf | Jan. 18, 1944 |
| 2,406,299 | Koulicovitch | Aug. 20, 1946 |
| 2,444,933 | Jasperson | July 13, 1948 |
| 2,462,292 | Snyder | Feb. 22, 1949 |
| 2,466,225 | Gee | Apr. 5, 1949 |
| 2,479,802 | Young | Aug. 23, 1949 |
| 2,481,347 | Riggin | Sept. 6, 1949 |

FOREIGN PATENTS

| Number | Country | Date |
|---|---|---|
| 186,574 | Germany | June 26, 1907 |
| 192,356 | Germany | Nov. 9, 1907 |
| 22,077 | Denmark | Apr. 12, 1917 |
| 147,690 | Great Britain | Sept. 15, 1921 |
| 75,127 | Sweden | Aug. 23, 1932 |